May 31, 1960   W. J. FLAJOLE   2,938,570
SEAT CONSTRUCTION
Filed July 5, 1957
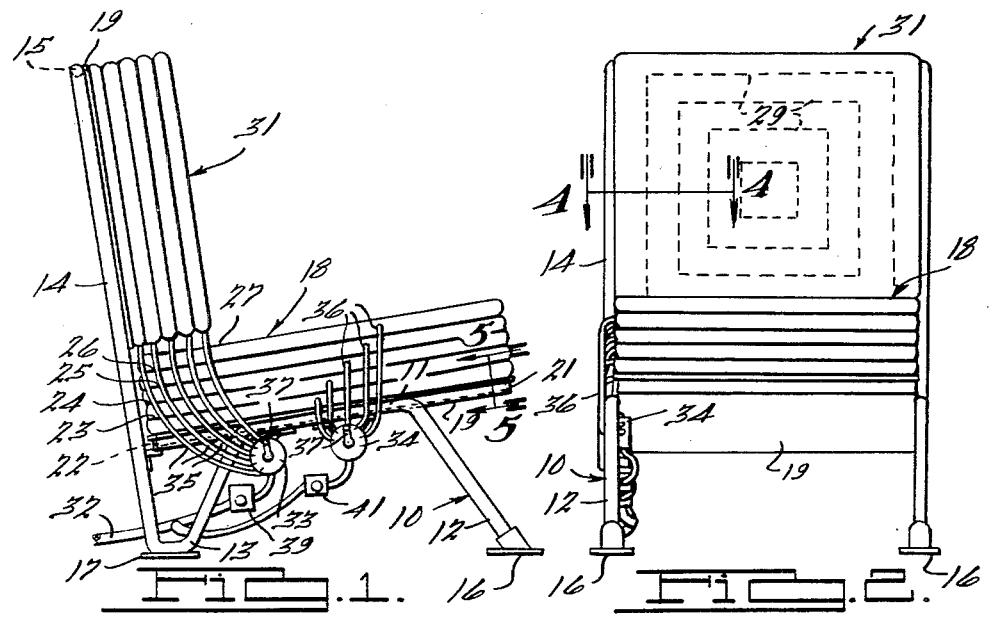
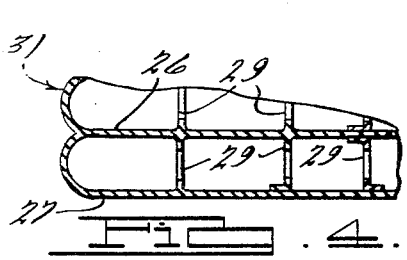
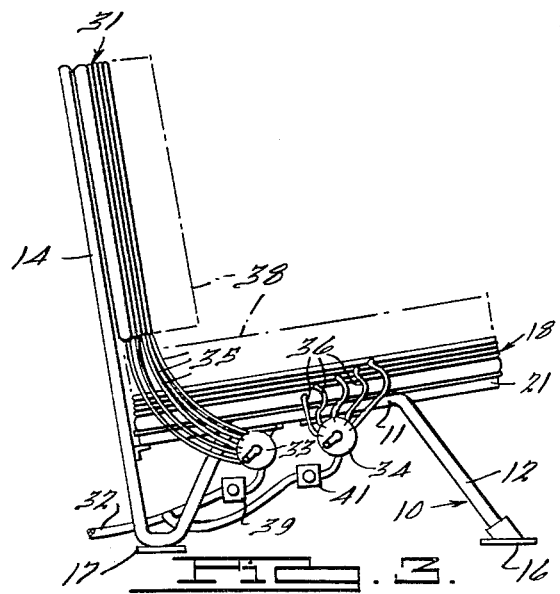
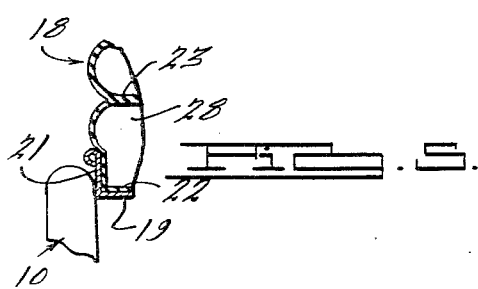
INVENTOR.
William J. Flajole.
BY
Harness, Dickey & Pierce.
ATTORNEYS.

United States Patent Office 2,938,570
Patented May 31, 1960

2,938,570
SEAT CONSTRUCTION

William J. Flajole, 20650 Breezewood, Southfield Township, Oakland County, Mich.

Filed July 5, 1957, Ser. No. 670,027

6 Claims. (Cl. 155—5)

This invention relates to seat structures and particularly to a seat structure having air cushions thereon by which the occupant may be adjusted vertically and horizontally toward and from the steering wheel of an automotive vehicle.

Supports have been provided for a seat heretofore which move the seat bodily in a horizontal and vertical direction for positioning the occupant of the seat relative to the steering wheel of the automotive vehicle.

The present invention produces a similar movement of the occupant in the horizontal and vertical planes relative to the steering wheel. This is accomplished by providing a seat and back cushion made of separate layers of a material impervious to the passage of air and controlling the inflation of the different compartments formed thereby. Thus, for example, if five compartments are provided to the cushion, the occupant will be positioned closer to the wheel in both the horizontal and vertical planes when all of the compartments are inflated. When the compartments are substantially one inch in thickness when inflated, the deflation of one of the compartments will cause the seat cushion to be lowered one inch and the back cushion to be retracted one inch from the steering wheel. This same result is produced when the support heretofore employed was moved downwardly and rearwardly one inch. By deflating others of the compartments, the occupant of the cushion will be lowered and permitted to move rearwardly and conversely, by inflating different compartments, the occupant is raised and moved forwardly. Different pressures may be provided on different compartments by the use of pressure regulating valves so that different degrees of firmness may be obtained. Settings may be provided on the valve to which the valve actuator is moved to inflate one or a plurality of the compartments to provide adjustment and a predetermined firmness. By moving the actuator to another position, the seat may be lowered and moved further rearwardly and the same, a greater, or less firmness provided thereto.

It is to be understood that the different compartments formed by the material impervious to the passage of air have interconnecting strips or webs between adjacent layers to prevent the layers from ballooning out, and retain the layers in substantially parallel planes irrespective of the amount of air delivered thereto.

The main objects of the invention are: to provide a seat and back cushion for a seat structure which have a plurality of compartments which are individually inflatable; to a provide a seat structure having inflatable seat and back cushions which are adjusted to seat an occupant in a predetermined position relative to the steering wheel of an automotive vehicle; to provide a seat structure having a plurality of inflatable compartments with webs between the layers which provide communicating areas and means for limiting the separation of the layers when the compartments are inflated, and in general, to provide a seat structure which adjusts the occupant in horizontal and vertical planes by the control of the supply of air thereto, all of which is simple in construction, positive in operation, and economical of manufacture.

Other objects and features of the novelty of the invention will be specifically pointed out or will become apparent when referring, for a better understanding of the invention, to the following description taken in conjunction with the accompanying drawing wherein:

Figure 1 is a view in side elevation of a seat structure having an inflatable seat and back cushion thereon embodying features of the present invention;

Fig. 2 is a front view in elevation of the seat structure illustrated in Figure 1;

Fig. 3 is a view of the seat structure illustrated in Figure 1 having the seat and back cushion thereof partially deflated;

Fig. 4 is an enlarged sectional view of the structure illustrated in Fig. 4, taken along the line 4—4 thereof; and Fig. 5 is an enlarged sectional view of the structure illustrated in Figure 1, taken along the line 5—5 thereof.

Referring to the figures of the drawing, the seat structure of the present invention embodies a base support 10, herein illustrated as being made from a tube provided with a central section 11 and forward and rearward leg portions 12 and 13. The leg portion 13 may have an upwardly extending back supporting section 14 joined thereto, the two sections being connected at the top by a bridging section 15 forming an inverted U-shaped structure for the support of the back cushion. A securing foot 16 is provided on the end of the forward leg portions 12 and a securing foot 17 is attached to the rear leg portion 13 at the junction with the back supporting sections 14.

A seat cushion 18 is supported by the central portions 11 of the seat supporting elements 10 at opposite sides of the seat structure and by the brackets on the back sections 14. The support embodies a platform 19 which may be constructed in any manner, but as clearly illustrated in Fig. 5, is made from a sheet of metal having a flanged edge 21 for receiving the bottom portion of the cushion 18. The material of the cushion is secured to the platform preferably by suitable bonding material such as "Cycleweld" and the like, which are known in the art to be suitable for this purpose. It is to be understood that the supporting platform 19 may be made from a sheet of reinforced resin material which readily bonds to the material of the seat cushion, or which may be made a part thereof during the molding process. Several layers of resin impregnated canvas, when secured together by heat and pressure, would provide such a reinforced platform.

The seat cushion 18 has a plurality of layers 22, 23, 24, 25, 26 and 27. The pair of adjacent layers forms a compartment such as compartment 28, formed by the layers 22 and 23. Webs 29 are provided between the various layers 22 and 23, 23 and 24, 24 and 25, 25 and 26, and 26 and 27 for the purpose of maintaining the various layers in substantially parallel relation to each other when inflated. It is to be understood that the webs have openings therein or are spaced apart at different points to have all of the areas of the compartments freely communicating with each other.

A back cushion 31 has the same construction as the seat cushion 18, being mounted on a platform 19 which is secured to the back sections 14 by suitable means, as by welding the platform, if made of metal, by having a pocket formed on the back layer which extends downwardly over the inverted U-shaped sections 14 and 15, or which may have tabs which are secured to the back sections by suitable screws or bolts.

An air delivery line 32 is connected to a pair of valves 33 and 34. The valve 33 is connected by tubes 35 to the individual compartments of the back cushion 31, while tubes 36 connect the compartments of the seat cushion 18 to the valve 34. By operating the actuating handles 37 of the valves, any number of the compartments of the seat and back cushions may be inflated. Thus, as seen in Figure 1, all of the compartments are inflated, while in Fig. 3 only the bottom compartment 28 is inflated. It will be noted from the dotted lines 38 the amount that the occupant had been lowered and moved backwardly in the seat. Thus, through the inflation of the various compartments of the seat, the occupant may be raised and moved forward or lowered and moved backwardly any desired amount, to be disposed in a desired position relative to the steering wheel of an automotive vehicle.

A pressure regulating valve 39 may be provided in the line to the valve 33 and a pressure regulating valve 41 may be provided in the line to the valve 34. By this means, the pressure on the seat and back cushion may be independently adjusted to produce the desired firmness for the depth of the cushions employed for each individual occupant. The valves 33 and 34 are preferably connected to the tubes 35 and 36 in such manner that in one position the first compartment 28 would be inflated, in another position the next compartment would be inflated, and so on until all of the compartments of each of the cushions are inflated. Similarly, the pressure on the back and seat cushion may be independently adjusted to regulate the firmness of the resulting cushion. It is within the purview of this invention to employ a regulating valve for each of the interconnecting tubes 35 and 36, permitting them to be individually adjusted so that the different pressures may be employed for the air in any of the compartments. Such an arrangement produces a desired firmness to the cushions, while permitting the cushions to contour and provide the desired seating comfort for the occupant.

It is to be understood that by plurality of compartments, two or more of the compartments will produce satisfactory results. At least one of the compartments would be employed for changing the distance between the occupant and the wheel of the automotive vehicle, and at least one other of the compartments would be employed for producing firmness.

It is to be understood that any type of valve could be employed. A single valve could be utilized for controlling the pressure in any or all of the compartments in the seat and back cushion, as well as the pressure on the air in any of the compartments. Such a single valve would simplify the control for positioning the occupant of the seat structure.

What is claimed is:

1. In a seat construction, a base support for a seat cushion, a back support for a back cushion, a seat cushion on said base support having a plurality of compartments disposed one above the other, a back cushion on said back support having a plurality of compartments one before the other, and means for selectively inflating said compartments to regulate the height and forward position of the seat occupant.

2. In a seat construction, a base support for a seat cushion, a back support for a back cushion, a seat cushion on said base support having a plurality of compartments disposed one above the other, a back cushion on said back support having a plurality of compartments one before the other, means for selectively inflating said compartments to regulate the height and forward position of the seat occupant, a platform secured to said seat and back supports, and means for securing said seat and back cushions to said platforms.

3. In a seat construction, a base support for a seat cushion, a back support for a back cushion, a seat cushion on said base support having a plurality of compartments disposed one above the other, a back cushion on said back support having a plurality of compartments one before the other, means for selectively inflating said compartments to regulate the height and forward position of the seat occupant, a platform secured to said seat and back supports, means for securing said seat and back cushions to said platforms, a plurality of tubes individually connected to the compartments of said seat and back cushions, a pair of valves connected to the tube of said respective cushions, and an air supply line connected to said valves which controls the inflation of the compartments of said cushions.

4. In a seat construction, a base support for a seat cushion, a back support for a back cushion, a seat cushion on said base support having a plurality of compartments disposed one above the other, a back cushion on said back support having a plurality of compartments one before the other, means for selectively inflating said compartments to regulate the height and forward position of the seat occupant, a platform secured to said seat and back supports, means for securing said seat and back cushions to said platforms, a plurality of tubes individually connected to the compartments of said seat and back cushions, a pair of valves connected to the tube of said respective cushions, an air supply line connected to said valves which controls the inflation of the compartments of said cushions, and pressure regulating valves in said air supply line for controlling the amount of pressure on the air in said compartments.

5. In a seat construction, a seat frame, a seat cushion on said frame having a plurality of layers of compartments one above the other, a back cushion on said frame having a plurality of layers of compartments one before the other, a plurality of tubes connected individually to the compartments of the back cushion, a valve to which said tubes are connected, additional tubes connected to the compartments of said seat cushion, a valve to which said tubes are connected, and a supply line for air connected to said valves, said valves controlling the number of compartments which are inflated to regulate the height and forward position of the seat occupant.

6. In a seat construction, a seat frame, a seat cushion on said frame having a plurality of layers of compartments one above the other, a back cushion on said frame having a plurality of layers of compartments one before the other, a plurality of webs interconnecting the adjacent layers of the compartments of the seat and back to maintain the layers in substantially parallel relation to each other when inflated, a plurality of tubes connected individually to the compartments of the back cushion, a valve to which said tubes are connected, additional tubes connected to the compartments of said seat cushion, a valve to which said tubes are connected, a supply line for air connected to said valves, and pressure regulating valves in the supply lines to said valves, said valves controlling the number of compartments which are inflated to regulate the height and forward position of the seat occupant.

References Cited in the file of this patent

UNITED STATES PATENTS

| 2,051,703 | Hall | Aug. 18, 1936 |
| 2,604,641 | Reed | July 29, 1952 |
| 2,609,177 | Hughes | Sept. 2, 1952 |
| 2,672,183 | Forsyth | Mar. 16, 1954 |
| 2,672,917 | Collura | Mar. 23, 1954 |
| 2,684,672 | Summerville | July 27, 1954 |
| 2,685,906 | Williams | Aug. 10, 1954 |

FOREIGN PATENTS

| 191,459 | Great Britain | Jan. 11, 1923 |
| 197,243 | Switzerland | July 16, 1938 |
| 471,722 | Great Britain | Sept. 9, 1937 |